(12) United States Patent
Tippey et al.

(10) Patent No.: US 9,550,487 B2
(45) Date of Patent: Jan. 24, 2017

(54) NO-DELAY OVERLAY PNEUMATIC AIR BRAKE SYSTEM

(71) Applicants: Jeffrey Scott Tippey, Arlington, TX (US); Amanda Tippey, Arlington, TX (US); Darold Tippey, Kennedale, TX (US)

(72) Inventors: Jeffrey Scott Tippey, Arlington, TX (US); Amanda Tippey, Arlington, TX (US); Darold Tippey, Kennedale, TX (US)

( * ) Notice: Subject to any disclaimer, the term of this patent is extended or adjusted under 35 U.S.C. 154(b) by 161 days.

(21) Appl. No.: 14/318,570

(22) Filed: Jun. 27, 2014

(65) Prior Publication Data

US 2015/0015060 A1 Jan. 15, 2015

Related U.S. Application Data

(60) Provisional application No. 61/845,485, filed on Jul. 12, 2013.

(51) Int. Cl.
*B60T 15/02* (2006.01)
*B60T 17/22* (2006.01)
*B60T 13/66* (2006.01)

(52) U.S. Cl.
CPC ............ *B60T 17/228* (2013.01); *B60T 13/665* (2013.01)

(58) Field of Classification Search
CPC ...... B60T 17/22; B60T 17/228; B60T 13/665; B60T 8/885; B60W 50/04; B60W 50/0205; B60W 10/18; B60W 10/20
See application file for complete search history.

(56) References Cited

U.S. PATENT DOCUMENTS

| | | | |
|---|---|---|---|
| 5,722,736 A | 3/1998 | Cook | |
| 5,924,774 A * | 7/1999 | Cook | B60T 13/665 303/115.2 |
| 7,455,370 B2 * | 11/2008 | Root | B60T 7/16 303/15 |
| 2002/0153766 A1* | 10/2002 | Kettle, Jr. | B60T 13/665 303/15 |
| 2006/0290199 A1* | 12/2006 | Beck | B60T 13/665 303/7 |

* cited by examiner

*Primary Examiner* — Vishal Sahni
(74) *Attorney, Agent, or Firm* — Law Office of Jeff Williams; J. Oliver Williams

(57) ABSTRACT

The present application relates to a braking system for a train that is configured to operate in combination with pneumatic systems. The braking system includes an electronic control board and an electronic control valve coupled to the brake pipe on a railcar. The braking system is located on one of a number of railcars dispersed throughout the train. The electronic control board monitors a brake signal from the locomotive and selectively transmits signal data to the electronic control valve to release air pressure within the brake pipe. The braking system provides one or more air release locations within the brake pipe so as to reduce braking stresses.

20 Claims, 3 Drawing Sheets

NO-DELAY OVERLAY PNEUMATIC AIR BRAKE SYSTEM

BACKGROUND

1. Field of the Invention

The present application relates generally to locomotives and, more particularly, to a brake system for use with a pneumatic brake system on a train.

2. Description of Related Art

Locomotives have been used for many years as a means of transporting people and cargo. Due to the significant loads locomotives haul, the time and distance it takes to attain a desired level of speed and to ultimately decrease speed is rather large when compared to motorized vehicles. Improvements in braking systems have been needed for some time.

For example, currently air brakes are used in freight trains. Such braking systems create a delay in being applied evenly throughout the train. A single pneumatic valve is typically located on the forward locomotive. When brakes are to be applied, a brake signal opens the pneumatic valve to release air pressure within the brake pipe. This causes a pulse wave through the brake pipe where an non-uniform pressure drop occurs within the brake pipe. Brakes are applied sequentially from car to car along the train as the pulse wave (signal) moves through the train's brake pipe. A time delay occurs from the signal reception and resultant braking in the first car to the signal reception and resultant braking in the last car. This causes an uneven application of brakes resulting in increased stopping distances and the creation of in-train forces and stresses.

A device occasionally used to try and improve the design are electronically controlled pneumatic (ECP) brakes. Such systems are typically designed to incorporate electronic controls that replace the existing pneumatic operation of each brake with an electronically operated brake. For example, the pneumatic system is replaced by an electronically controlled system where electronic valves actuate a piston to apply brakes. Pressurized air within the brake pipe is used primarily to replenish the air cylinder used to operate the piston.

ECP brake systems generally interfere with existing pneumatic brake systems. Modifications are required to the pneumatic systems to incorporate the ECP brake systems. The modifications prevent ECP brake system cars from operating interchangeably with cars utilizing solely pneumatic brake systems. A disadvantage of the ECP system is the need for it to be applied to each car to ensure a consistent and even braking since the existing air brake system is modified. This therefore decreases the interchangeability of rail cars between trains of different braking systems. Also, costs and weight increase when each train car is required to need braking modifications.

A more interchangeable and cost effective braking system is needed. Although great strides have been made in braking systems, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
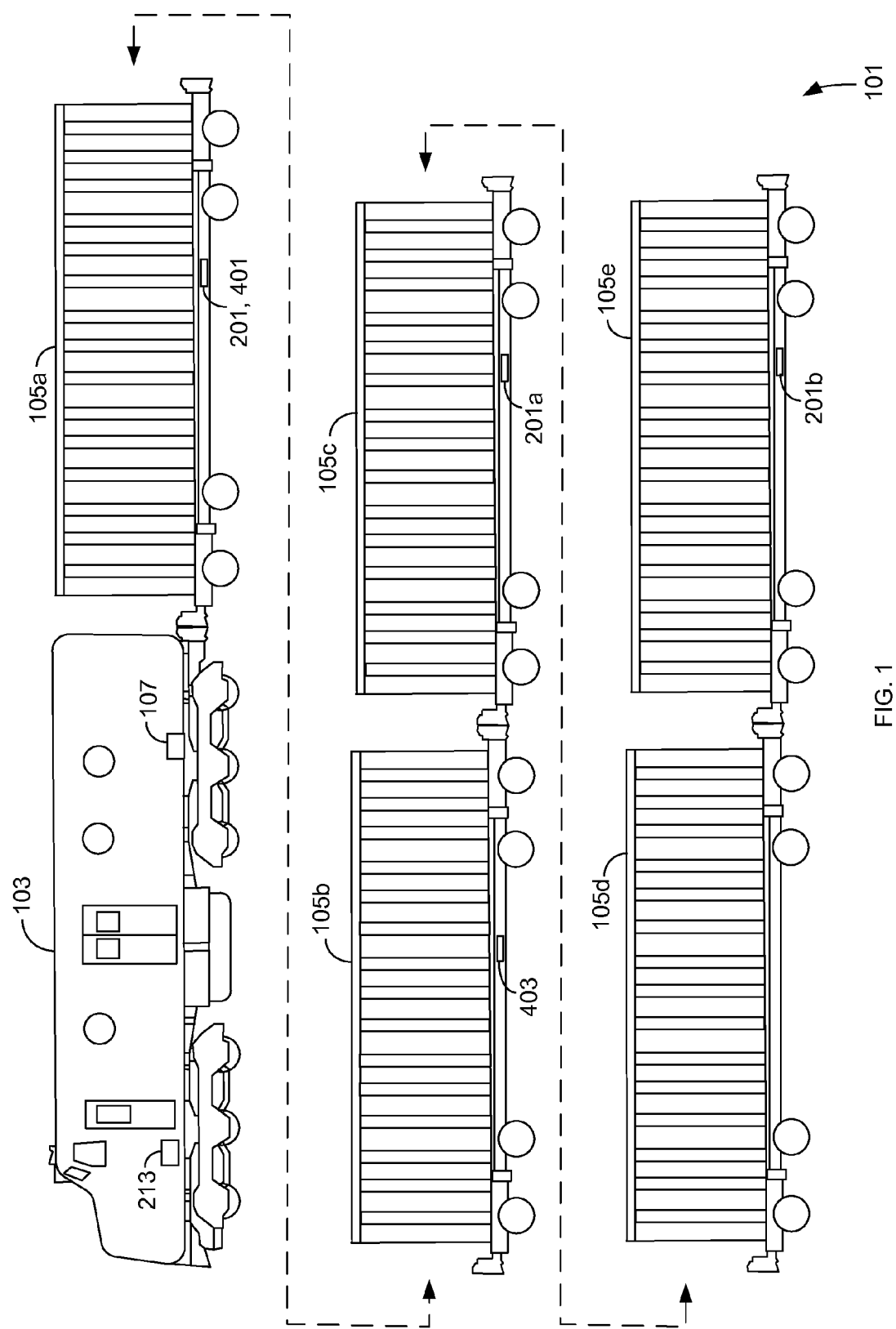
FIG. 1 is a side view of a train with a pneumatic braking system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIGS. 1-4 in the drawings, a pneumatic braking system 201 is illustrated. FIG. 1 shows a train 101 having a locomotive 103 and a plurality of railcars 105*a-e* interconnected. Train 101 is equipped with a pneumatic braking system in which air pressure is used to selectively apply and/or release brakes associated with locomotive 103 and railcars 105*a-e*. A brake pipe 207 extends throughout the length of train 101 and holds the pressurized air. As pressure is maintained within the brake pipe 207 above a selected level, the brakes are disengaged and avoid applying a braking force. As pressure is reduced in the brake pipe 207, the brakes engage the railcar and locomotive and apply the braking force. In other words, brakes are applied as the pressure within the brake pipe 207 decreases.

Braking system 201 is configured to selectively increase the number of pressure release locations along brake pipe 207 to permit a more uniform reduction in air pressure. By increasing the number of pressure release locations within brake pipe 207, the application of brakes within train 101 becomes more uniform and simultaneous from the forward railcars to the rearmost railcars. The result is a decrease in the formation of in-train forces and stresses throughout the train. Braking system 201 works in combination with a pneumatic valve 107 located on locomotive 103 to release air pressure in brake pipe 207.

Figure 2:
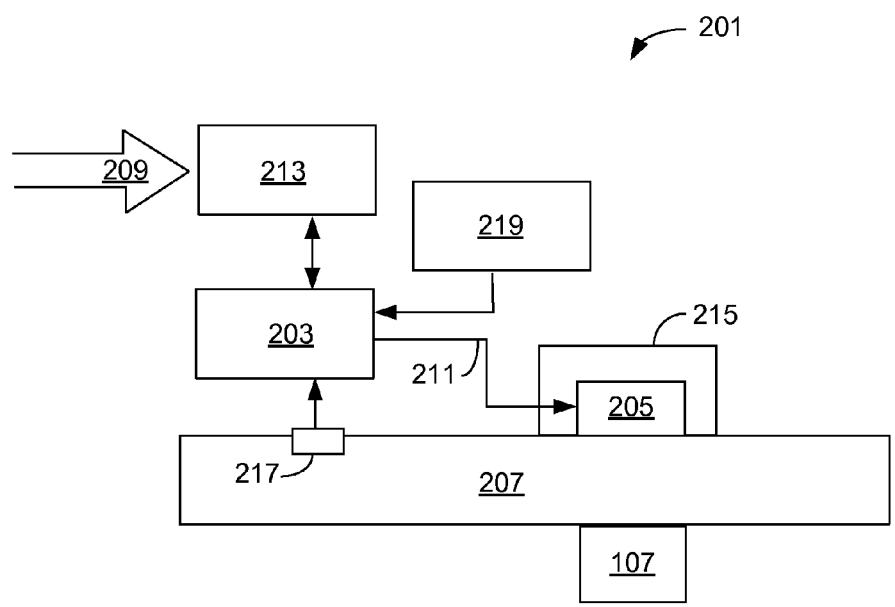
FIG. 2 is a schematic of the pneumatic braking system of FIG. 1.

In particular with FIG. 2, braking system 201 includes an electronic control board 203 and an electronic control valve 205. Board 203 monitors a brake signal 209 from locomotive 103. When detected, brake signal 209 is transmitted from locomotive 103, through board 203, and on to pneumatic control valve 107 to release air pressure within brake pipe 207. Board 203 is configured to receive brake signal 209, process the signal 209 and generate signal data 211. Signal data 211 is command data sent to valve 205 from board 203 to selectively open and close valve 205. Valve 205 is in communication with brake pipe 207. Both board 203 and valve 205 are located on a singular railcar as seen in FIG. 1.

Brake signal 209 is transmitted to board 203 in at least one of two ways. First, board 203 may be configured to receive brake signal 209 directly from locomotive 103 (see FIG. 3). This may occur through direct wiring. Alternatively, wireless communications are also possible and contemplated where locomotive 103 is equipped to transmit brake signal 209.

Figure 4:
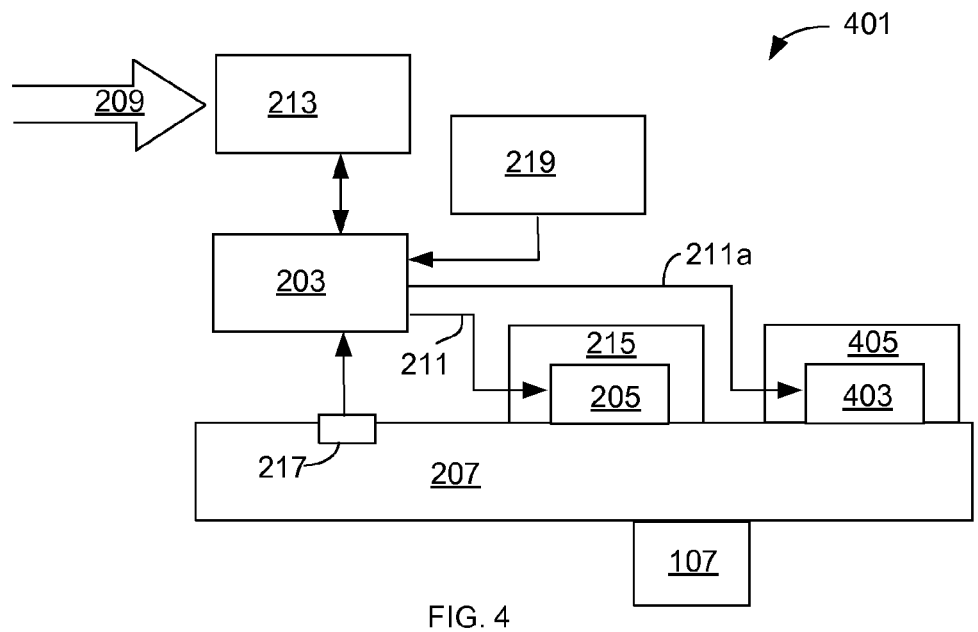
FIG. 4 is a schematic of a second alternative embodiment of the pneumatic braking system of FIG. 2.

A second way of transmitting brake signal 209 to board 203 involves the use of a communication system. This is illustrated in FIGS. 2 and 4. Brake system 201 may further include a communication system 213 to receive brake signal 209 and transmits the brake signal to board 203. The transmission of brake signal 209 may be performed through wired and/or wireless communications. When wireless, board 203 is equipped to receive such wireless communications. In receiving brake signal 209 with either of the above described ways, board 203 is configured to receive brake signal 209, process brake signal 209 to form signal data 211, and transmit the signal data 211 to valve 205 in order to activate a brake associated with a particular railcar.

Electronic control valve 205 is in electronic communication with board 203 and is configured to receive wired and/or wireless signal data 211 from board 203. The signal data 211 instructs valve 205 to selectively open and/or close. Valve 205 is releasably coupled to a portion of a brake pipe 207, wherein valve 205 is configured to permit the venting of pressurized air. Pressurized air is retained within brake pipe 207 when valve 205 is closed. Pressurized air is released from brake pipe 207 when valve 205 is opened. By selectively releasing air within brake pipe 207, valve 205 selectively activates the brakes.

Brake system 201 may further include a valve housing 215 configured to surround and protect valve 205. Housing 215 is coupled to brake pipe 207 with one or more fasteners. It is understood that housing 215 is configured to be removable from brake pipe 207 so as to permit access to monitor, maintenance, and repair valve 205. In another embodiment, housing 215 may be coupled to brake pipe 207 with one of a number of quick release type fasteners, such as clips and clamps. Quick release fasteners provide time savings when accessing valve 205.

Brake system 201 may also further include a sensor 217 configured to read pressure data within brake pipe 207 and transmit such pressure data to board 203. Sensor 217 provides a feedback mechanism to board 203 to compare actual pressure against the desired pressure. Board 203 may use this data to adjust and compensate for errors in the signal data 211 or for detection of faulty valve operation.

Power is provided to brake system 201 through power system 219. Power system 219 may include at least one of a battery, ultra-capacitor, or any other power storage technology to allow power system 219 to store energy. Power system 219 selectively delivers power to board 203 and other auxiliary systems and devices (i.e. 213, 205). Board 203 interacts with power system 219 to minimize the power draw and selectively restrict power consumption of auxiliary systems and devices. Where power system 219 is not used, board 203 receives power through locomotive 103.

Figure 3:
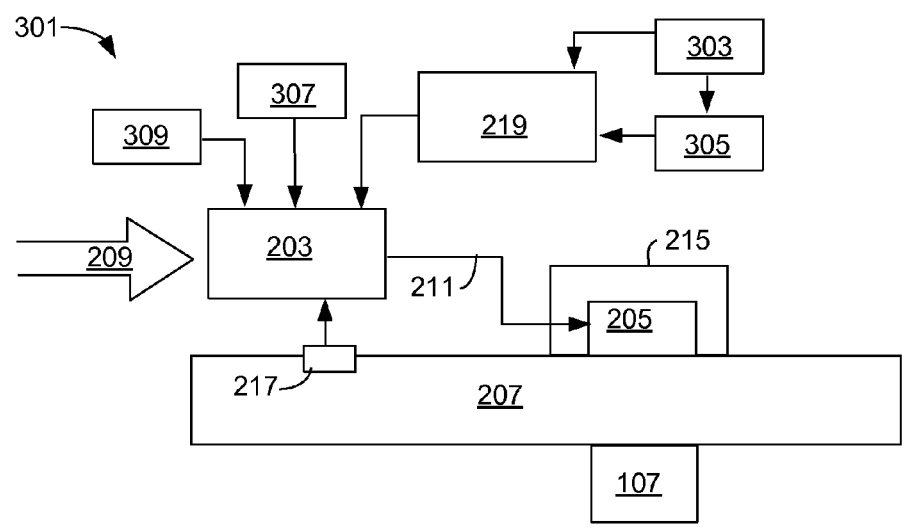
FIG. 3 is a schematic of an alternative embodiment of the pneumatic braking system of FIG. 2.

Referring now in particular to FIG. 3 in the drawings, an assortment of optional auxiliary systems and devices are illustrated. Brake system 301 is illustrated in FIG. 3. Brake system 301 is similar in form and function to that of brake system 201 described above with respect to FIG. 2. One difference is in that brake signal 209 is transmitted directly to board 203 without the use of communication system 213. It is understood that brake system 301 may include communication system 213 as seen in FIG. 2, but is left out in FIG. 3 for illustrative purposes only.

Brake system 301 may include at least one of a power harvesting system 303, a power conditioning system 305, a global positioning system 307, and a data acquisition system 309. Power harvesting system 303 is configured to generate power from the environment and provide such power to power system 219. By using power generation practices taken from the environment, power system 219 is able to substantially decrease the size of an internal power storage device. Any such power storage device may then be used as a backup supply (i.e. when power harvesting fails or when the train is not moving). Various types of power harvesting systems are available, such as solar power generation and dynamic generation produced from movement of the wheels are two such examples. It is important to note that power harvesting system 303 may be configured to harvest power in reliance upon movement of train 101 and/or independent of the movement of train 101 (solar). Power conditioning system 305 is optionally used if the power generated by system 303 is needing to be modified from its captured form to a form suitable to system 301 (i.e. voltage changes, AC or DC current . . . ).

Global positioning system 307 is in communication with board 203 and is configured to record and transmit information related to at least one of location, time, and speed of train 101. This information may be used to track delivery schedules and train operations routes. By having system 307 located with each board 203, system 307 is able to specifically track a particular railcar during transportation. Where system 307 is not used, location devices and information produced from locomotive 103 may be modified so as to be compatible with system 301.

Data acquisition system 309 is a computerized device configured to monitor and store system 301 performance metrics. System 309 is in electronic communication with board 203 of system 301. Data is passed back and forth between systems 309, 203. System 309 may include one or more sensors and alarms to record data related to the environment and operation of system 301. Alarms may be used to provide warning indications to an operator or other user either on locomotive 103 or remote to train 101 (i.e. operations center).

Figure 5:
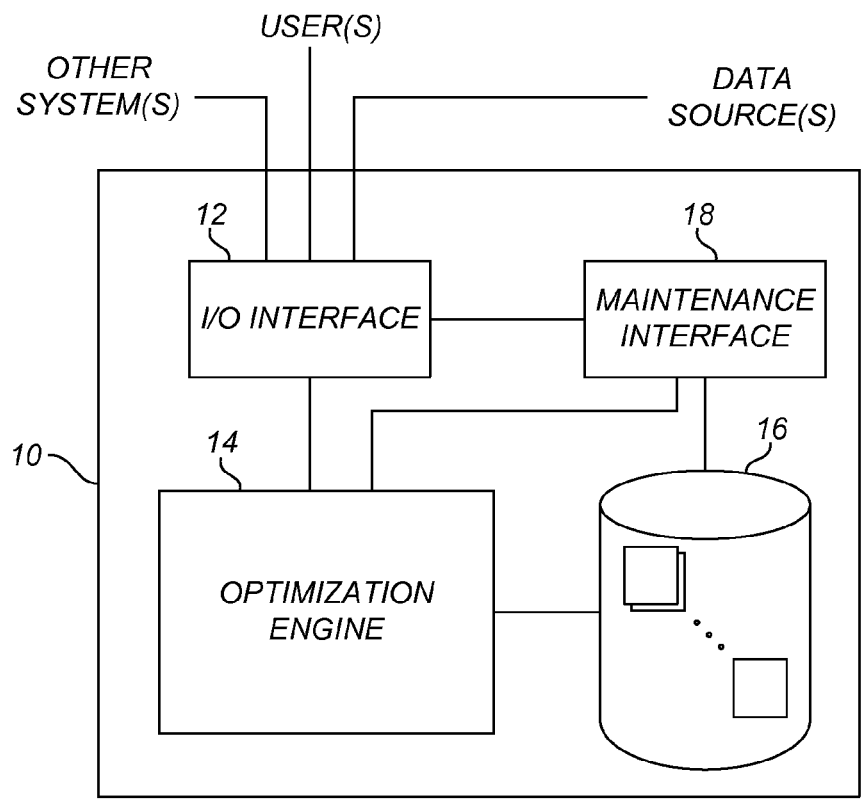
FIG. 5 is a schematic of an exemplary computer device used in the pneumatic braking system of FIG. 1.

Referring now also to FIG. 5 in the drawings, a detailed exemplary schematic of system 309 is illustrated. FIG. 5 illustrates an exemplary acquisition system 10 for monitoring, recording and transmitting performance metrics of system 301. System 309 may include the elements and features of system 10. Such features may permit local and remote user control of system 301 to access and download data, verify proper operation of the system 301, diagnose system 301 irregularities or failures, and perform updates to name a few.

System 10 includes an input/output (I/O) interface 12, an optimization engine 14, a database 16, and a maintenance interface 18. Alternative embodiments can combine or distribute the input/output (I/O) interface 12, optimization engine 14, database 16, and maintenance interface 18 as desired. Embodiments of the optimization system 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of system 10. The I/O interface 12 can be configured for allowing one or more users to input information to system 10 via any known input device. Examples can include a keyboard, mouse, touch screen, microphone, and/or any other desired input device. The I/O interface 12 can be configured for allowing one or more users to receive information output from system 10 via any known output device. Examples can include a display monitor, a printer, a speaker, and/or any other desired output device. The I/O interface 12 can be configured for allowing other systems to communicate with system 10. For example, the I/O interface 12 can allow one or more remote computer(s) to access information, input information, and/or remotely instruct system 10 to perform one or more of the tasks described herein. The I/O interface 12 can be configured for allowing communication with one or more remote data sources. For example, the I/O interface 12 can allow one or more remote data source(s) to access information, input information, and/or remotely instruct system 10 to perform one or more of the tasks described herein.

The database 16 provides persistent data storage for system 10. While the term "database" is primarily used, a memory or other suitable data storage arrangement may provide the functionality of the database 16. In alternative embodiments, the database 16 can be integral to or separate from system 10 and can operate on one or more computers. The database 16 preferably provides non-volatile data storage for any information suitable to support the operation of system 10, including various types of data discussed in this application.

The maintenance interface 18 is configured to allow users to maintain desired operation of system 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of the optimization engine 14 and/or the I/O interface 12. This can include, for example, software updates and/or administrative tasks such as security management and/or adjustment of certain tolerance settings.

Referring in particular to FIG. 4 in the drawings, an alternative embodiment of system 201 and 301 is illustrated. Braking system 401 is similar in form and function to that of system 201. Additionally, braking system 401 may include any one of the auxiliary systems and devices described in system 301. As seen previously with systems 201 and 301, board 203 receives brake signal 209 from locomotive 103 and transmitted signal data 211 to a singular valve 205.

Braking system 401 is configured to incorporate a plurality of valves in communication with a singular control board 203. In such an embodiment, board 203 acts as a central hub to distribute signal data 211. System 401 may selectively activate or deactivate any valve separately from another valve. As seen in FIG. 4, board 203 transmits signal data 211, 211a to valve 205 and valve 403 respectively. In FIG. 1, valve 403 is illustrated as a stand-alone valve coupled to brake pipe 207 at railcar 105b. If brake system 401 was coupled to railcar 105a, valve 403 would receive signal data 211a from board 203. Although, valve 403 may be located on a separate car from that of board 203 in system 401; valve 403 may alternatively be located on the same railcar as board 203. The proper location of valve 403 will be determined based upon design considerations. Valve 403 is protected by housing 405 having a similar form and function to that of housing 215 disclosed above.

It is understood that train 101 may use multiple brake systems similar in form and function to brake systems 201, 301, 401. For example, FIG. 1 shows the use of brake system 201, 201a, 201b each located on a different railcar. Brake systems 201a, 201b may individually represent either system 301 or 401. Any combination of systems 201, 301, and 401 may be used with train 101. Multiple brake systems work seamlessly to provide a more uniform reduction of air pressure in brake pipe 207.

The operation of the system will be described with respect to system 201, however all brake systems described herein operate in a similar manner. In operation, brake system 201 is configured to monitor the brake signal transmitted from the locomotive. The brake signal is generated to selectively activate the pneumatic brake system of the train. The brake signal is communicated to an electronic control board where it is processed and interpreted to formulate a signal data. The signal data is transmitted by the electronic control board to the electronic control valve to selectively release air pressure within the brake pipe at selected locations along the train. The releasing of air helps to provide for a more uniform application of brakes amongst the railcars of the train. Braking system 201 records performance metrics related to the performance of the pneumatic brake system. The performance metrics may be downloaded to a secondary device.

In configurations where multiple electronic control boards are provided throughout the train, distance between the electronic control board and the locomotive may result is poor signal transmissions. Poor signal transmissions may prevent a particular electronic control board from receiving the brake signal from the locomotive. The electronic control boards are therefore optionally configured to not only receive the brake signal from the locomotive, but also are configured to act as a repeater and rebroadcast the brake signal to downstream locations on the train. Rebroadcasting of the brake signal from the locomotive via the individual electronic control boards helps to ensure timely responses and even braking. It is understood that repeater functions of the electronic control boards are applicable to any of brake systems 201, 301, 401.

The current application has many advantages over the prior art including at least the following: (1) ability to be selectively installed and removed from a railcar without interference with existing pneumatic brake systems; (2) selective located release of air pressure from the brake pipe along the train; (3) railcar specific tracking; (4) decrease of braking stresses on the train; (5) uniform application of braking forces throughout the train.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A pneumatic brake system for regulating the speed of a train, comprising:
    an electronic control board configured to receive a brake signal from a locomotive, the electronic control board configured to receive the brake signal, generate signal data, and transmit the signal data to activate a brake;
    an electronic control valve in communication with a brake pipe at a first railcar, the electronic control valve being configured to receive the signal data and selectively release air pressure within the brake pipe at the first railcar so as to actuate the brake; and
    a pneumatic control valve in communication with the brake pipe at the first rail car and configured to release air pressure within the brake pipe in response to downstream pressure changes within the brake pipe;
    wherein release of air within the brake pipe by the electronic control valve increases the rate of response for the operation of the pneumatic control valve; and
    wherein the brake on the first railcar is applied as air pressure is reduced.

2. The pneumatic brake system of claim 1, wherein the electronic control valve is surrounded by an external housing coupled to the brake pipe.

3. The pneumatic brake system of claim 1, further comprising
    a sensor configured transmit pressure data to the electronic control board.

4. The pneumatic brake system of claim 3, wherein the electronic control board is configured to compare actual pressure data from the sensor with a desired pressure data as sent via the signal data, the electronic control board configured to adjust the signal data in response to pressure data from the sensor.

5. The pneumatic brake system of claim 1, further comprising:
    a communication system configured to transmit the brake signal to the electronic control board.

6. The pneumatic brake system of claim 1, further comprising:
    a power storage and supply system configured to provide power to the electronic control board and the electronic control valve.

7. The pneumatic brake system of claim 6, further comprising:
    at least one of an energy harvesting system and a power conditioning system, the energy harvesting system is configured to generate power from the environment and provide power to the power storage and supply system;
    wherein the power storage and supply system is configured to receive power from the energy harvesting system.

8. The pneumatic brake system of claim 1, further comprising:
    a global positioning device in communication with the electronic control board, the global positioning device being configured to record and transmit information related to at least one of location, time, and speed of the train.

9. The pneumatic brake system of claim 1, further comprising:
    a computerized device configured to monitor and store system performance metrics, the computerized device being configured to transmit metrics to the electronic control board.

10. The pneumatic brake system of claim 1, further comprising:
    a second electronic control valve coupled to the brake pipe in a neighboring railcar and configured to receive the signal data from the electronic control board, so as to release pressure within the brake pipe.

11. A pneumatic brake system for regulating the speed of a train, comprising:
    a brake pipe configured to retain pressurized air so as to withhold the application of a brake, the brake pipe extending through each locomotive and railcar in the train;
    a pneumatic valve coupled to the brake pipe in communication with the pressurized air, the pneumatic valve configured to selectively release air pressure within the brake pipe at the locomotive in response to a brake signal;
    a first electronic control board configured to monitor the brake signal from the locomotive, the electronic control board is configured to receive the brake signal, generate a first signal data, and transmit the first signal data, the first electronic control board located on a first railcar;
    an electronic control valve coupled to the brake pipe in a second railcar, the electronic control valve configured to receive the first signal data and selectively release pressure in the brake pipe of the second railcar so as to operate a corresponding pneumatic brake in the second railcar; and a pressure sensor configured to obtain and transmit pressure data from the brake pipe to the electronic control board for processing and correction of errors in the brake signal;

wherein the electronic control board and electronic control valve permit for the simultaneous actuation of a plurality of pneumatic brakes so as to reduce stresses in the train resulting from braking.

12. The pneumatic brake system of claim 11, further comprising:

a communication system configured to transmit the brake signal to the first electronic control board, the first electronic control board located on the first railcar.

13. The pneumatic brake system of claim 12, wherein the communication system communicates with the first electronic control board through at least one of wireless and wired communications.

14. The pneumatic brake system of claim 11, further comprising:

a second electronic control board configured to receive the brake signal, generate secondary signal data, and transmit the secondary signal data, the second electronic control board located on a second railcar; and a second electronic control valve in communication with the second electronic control board to receive the secondary signal data, the secondary signal data selectively opening and closing the second electronic control valve to selectively release pressure within the brake pipe at the second railcar.

15. The pneumatic brake system of claim 14, wherein the second electronic control board receives the brake signal from a communication system located on the locomotive.

16. The pneumatic brake system of claim 14, wherein the first electronic control board re-transmits the brake signal to the second railcar; and wherein the second electronic control board receives the brake signal from the first electronic control board.

17. The pneumatic brake system of claim 11, wherein the first electronic control board is configured to transmit signal data to a third electronic control valve.

18. A method of braking a train, comprising:

receiving a brake signal transmitted from a locomotive, the brake signal being generated to selectively activate a pneumatic brake system coupled to the train, the pneumatic brake system including a brake pipe;

processing the brake signal within an electronic control board located on a railcar, the electronic control board being configured to interpret the brake signal and generate signal data;

transmitting the signal data from the electronic control board to an electronic control valve in communication with the brake pipe, the electronic control valve coupled to the railcar;

releasing air pressure within the brake pipe by opening the electronic control valve so as to actuate a brake, release of air within the brake pipe by the electronic control valve increases the rate of response for the operation of the pneumatic brake system; and processing a pressure differential via a sensor in communication with the brake pipe, the sensor configured to transmit pressure feedback readings to the electronic control board to allow for the adjustment and correction for errors with the brake signal;

wherein the releasing of air pressure within the brake system applies one or more brakes associated with a railcar.

19. The method of claim 18, further comprising:

recording performance metrics related to the performance of the pneumatic brake system and storing the performance metrics on a computerized device.

20. The method of claim 19, further comprising:

downloading performance metrics from the computerized device.

* * * * *